(No Model.)

W. CLEMSON.
BICYCLE.

No. 304,504. Patented Sept. 2, 1884.

WITNESSES:
Otto Berger
C. Sedgwick

INVENTOR:
W. Clemson
BY Munn & Co
ATTORNEYS.

UNITED STATES PATENT OFFICE.

WILLIAM CLEMSON, OF MIDDLETOWN, NEW YORK.

BICYCLE.

SPECIFICATION forming part of Letters Patent No. 304,504, dated September 2, 1884.

Application filed May 7, 1884. (No model.)

*To all whom it may concern:*

Be it known that I, WILLIAM CLEMSON, of Middletown, in the county of Orange and State of New York, have invented certain new and useful Improvements in Bicycles, of which the following is a full, clear, and exact description.

The object of my invention is to provide certain new and useful improvements in bicycles, especially in the treadles, whereby a greater leverage is obtained with comparatively less power, the bicycle works more easily, and the danger of being thrown over the driving-wheel of the bicycle toward the front is decreased.

The invention consists of the combination of parts and their construction, substantially as hereinafter fully set forth, and pointed out in the claims.

Reference is to be had to the accompanying drawings, forming part of this specification, in which similar letters of reference indicate corresponding parts in both the figures.

Figure 1:
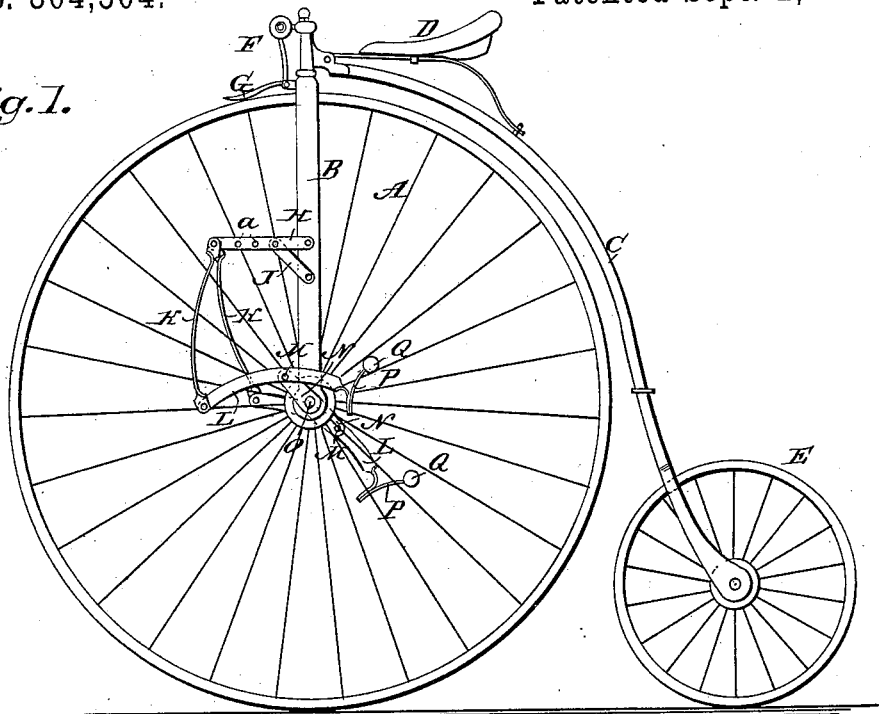
Figure 2:
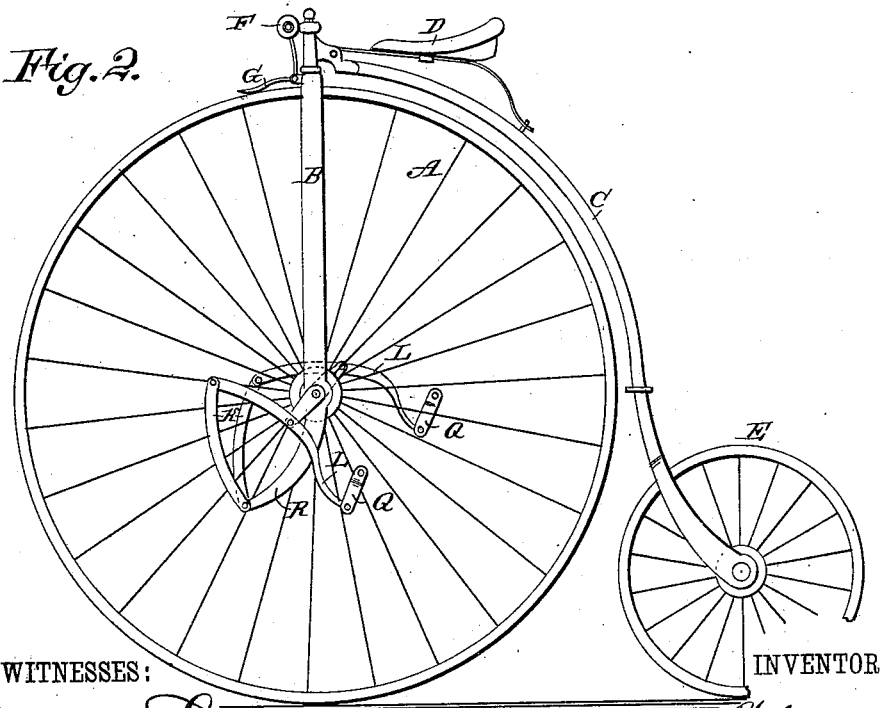

Figure 1 is a side view of my improved bicycle. Fig. 2 is a side view of a modification of the same.

A is the driving-wheel, B the fork, C the reach, D the seat, E the rear wheel, F the steering-handle, and G the brake, all of the usual construction.

To each shank of the fork B a bar, H, is pivoted at about half the height, which bar H projects toward the front, and is braced by a brace-bar, J, secured to the bar H and to the prong of the fork. The bar H is provided with a series of apertures, *a*.

To each bar H a connecting-bar, K, is pivoted at the outer end, and to the lower end of the connecting-bar the front end of a lever, L, is pivoted, which is pivoted at or near its center on a pin, M, formed on the end of a crank, N, formed on the end of the axle O, pivoted in the lower ends of the fork, and on which shaft the driving-wheel A is rigidly mounted. The rear end of each lever L is bent downward and then upward to form a spring-arm, P, on the upper end of which a foot-rest, Q, is pivoted.

In the modification shown in Fig. 2 the lower end of each shank of the fork B is bent downward and outward to form an arm, R, to the lower ends of which arms R the lower ends of the connecting-bars K are pivoted, the upper ends of the said bars being pivoted to the front ends of the levers L, which have their rear parts bent to form springs, on the rear ends of which levers the foot-rests Q are pivoted.

The advantages of my improved bicycle are as follows: The power of the feet is applied back of the center of the wheel, and thus the rider need not throw his entire weight in front of the center of the wheel, and the saddle can be set farther back, thereby decreasing the liability of the rider being thrown over the driving-wheel toward the front. The crank need be but about one-half the usual length, and the movement of the foot is decreased and much leverage and power are obtained. The rider is also enabled to use his weight in such a manner that it acts vertically and he need not exert as much muscle power. By providing the springs a greater or less leverage is provided automatically, as may be required. If much power is exerted—for instance, on an upgrade—the levers bend from the crank until from twenty to twenty-five more per cent. of leverage is obtained, and the recoil of the springs throws the crank over the bottom center. The spring contracts and thus decreases the foot travel, as a lever of equal length without the spring would carry the foot around a larger distance. The springs also counteract the shocks the bicycle receives, and the foot can hold more securely on the pedal, and the danger of a lost pedal is avoided. In the construction shown in Fig. 1 the outer ends of the bars or arms H can be adjusted higher or lower by adjusting the upper ends of the brace-bars J a greater or less distance from the free ends of the bars or arms H, thereby raising or lowering the foot-rests to exactly suit the rider.

In the construction shown in Fig. 2 a much smaller wheel can be used, thus increasing the safety and power of the bicycle.

Having thus described my invention, what I claim as new, and desire to secure by Letters Patent, is—

1. In a bicycle, the combination, with the wheels and fork, of levers pivoted at or near their centers on the cranks, bars connecting the front ends of the said levers with the fork, springs formed on the said levers, and foot-rests held on the rear ends of the said levers, substantially as herein shown and described, 2. In a bicycle, the combination, with the wheels and fork, of the arms H, having a series of apertures, *a*, the braces J, the connecting-bars K, the levers L on the cranks, and foot-rests on the inner ends of the levers L, substantially as herein shown and described.

3. In a bicycle, the combination, with the wheels and fork, of the arms adjustably connected and braced to said fork, and the levers about centrally pivoted to the crank, and connected by bars to said arms, the rear ends of said levers having upwardly-projecting springs to which are connected the foot-rests, substantially as and for the purpose set forth.

WILLIAM CLEMSON.

Witnesses:
HENRY W. WIGGINS,
WILLIAM W. TAYLOR.